(United States Patent Office)

2,902,447
Patented Sept. 1, 1959

2,902,447

COMPOSITION AND METHOD FOR INHIBITION OF CORROSION

Lewis O. Gunderson, Morton Grove, and Herman Kerst, Des Plaines, Ill., assignors to Dearborn Chemical Company, Chicago, Ill., a corporation of Illinois No Drawing. Application September 10, 1954
Serial No. 455,342

5 Claims. (Cl. 252—8.55)

The present invention is concerned with compositions and methods for the inhibition of the corrosion of metallic surfaces by the action of corrosive fluids.

The method and compositions of the present invention find particular applicability in the field of preventing corrosion in piping, containers, and other equipment associated with oil wells. The problem of corrosion is particularly severe in this field because the effluent in producing oil wells frequently is a severely corrosive mixture of brine and various petroleum products. These mixtures become even more corrosive in the presence of dissolved or dispersed corrosive gases, particularly hydrogen sulphide and carbon dioxide.

The problem of corrosion appears not only in the oil field but even after the petroleum products have been recovered and processed for the recovery of gasoline or refined oil. The problem becomes important where such petroleum products are pumped through pipe lines, and in storage tanks which hold these materials. Small amounts of acids which are picked up during the petroleum processing, or which are produced upon standing of the petroleum product contribute significantly to the corrosive effects.

The compositions and methods of the present invention, like the problem of corrosion itself, are not limited to the field of petroleum and petroleum products. Very severe corrosion problems are presented in industry, for example, where pickling acids and other industrial corrosive fluids are to be circulated or stored. Still other corrosion problems are presented by the circulation of aqueous liquids containing various ionic materials in industrial cooling systems.

The compositions of the present invention were designed to be useful wherever the problem of corrosion exists by the action of a corrosive liquid on a metallic surface.

The products of the present invention are characterized by a controlled balance between the hydrophilic and the lyophilic portions of an organic molecule. Thus, by suitable changes in this balance, the products of the present invention may range from materials which are substantially oil soluble to those which are more or less water soluble or dispersible. The preferred compounds of the invention, however, are predominantly oil soluble so that they are particularly useful in preventing corrosion in the petroleum fields. Thus, some of the products of the invention are primarily useful in the treatment of "sour" oil wells which have become excessively corrosive due to the action of hydrogen sulphide and other corrosion promoting agents and also in "sweet" oil wells in which these gases are not present to a damaging concentration. Products of this invention are also useful as corrosion inhibitors when used in conjunction with the process of acidizing oil wells to reduce the fluid flow resistance of oil containing formations.

In the treatment of "sour" crude oil wells, we have found that the composition of the molecule should be such as to shift the hydrophile-lyophile balance toward the lyophilic characteristic, whereas for the treatment of sweet wells, the best inhibitors are those which are predominantly more hydrophilic. In the treatment of aqueous solutions, a still different balance will produce optimum results, depending on factors such as the electrolyte concentration, pH value, concentration of dissolved gases, and other factors.

Because of their unique adaptability to both oil and water, the products of the present invention find particular usefulness in secondary oil recovery systems in which a more or less depleted oil source is flooded with water to bring the remaining oil to the surface.

An object of the present invention, therefore, is to provide an improved series of compositions for the purpose of inhibiting corrosion of metallic surfaces arranged to be in more or less continuous contact with corrosive fluids.

Another object of the invention is to provide a method for treating metallic surfaces to minimize the corrosive effect of corrosive fluids, both aqueous and nonaqueous, and to prevent deposition of scale.

Still another object of the invention is to provide a unique series of compounds which, because of their intermolecular balance are particularly adaptable for use with corrosive mixtures of petroleum products.

Still another object of the invention is to provide a method for the treatment of oil wells so as to minimize the effects of corrosion in the piping, machinery, storage tanks, and the like associated with the wells.

The foregoing objects are achieved, in accordance with the present invention, by employment of a series of organic compounds which fall into the broad classification of derivatives of polyalkylene polyamines. The polyalkylene polyamine series has been the general formula:

$$H_2N(C_nH_{2n}NH)_mC_nH_{2n}NH_2$$

where $n$ is 2 or 3 and $m$ is an integer from 0 to about 10.

Specifically, we have found that substantially improved corrosion resistance can be afforded to metallic surfaces by incorporating in the normally corrosive liquids which contact that surface, a carboxylic amide of the above family of polyalkylene polyamines, provided the amide is a completely acylated compound. By the term "hydrocarbon radical" we mean to include monovalent hydrocarbon radicals of various descriptions, including alkyl, alkenyl, cyclic or acyclic groups. Furthermore, the hydrocarbon groups may be substituted with oxygen or similar atoms, provided that these additional atoms do not materially change the hydrophobic characteristics usually associated with such hydrocarbon groups.

The compounds of the present invention are strongly polar and, when introduced into a producing well, appear to be preferentially adsorbed on the metal surfaces to form an impervious film which substantially prevents corrosion. The mechanism of such corrosion prevention presumably comprises the preferential adsorption of the inhibitor on metal surfaces by the displacement of water from the surfaces, thus bringing about preferential oil wetting of the surfaces, thereby preventing contact between the metal surface and the corrosive brine. Furthermore, the adsorbed organic inhibitor together with the oil, provides lubrication which is important in the case of the sucker rod and tubing of the well since this additional lubrication provides a prolonged life for both elements. The organic corrosion inhibitor has a further advantage that it tends to produce demulsification.

The preferred class of compounds for the purpose of the present invention, are the completely acylated polyalkylene polyamine compounds which include at least one long chain amide group formed from a high molecular weight carboxylic acid. By "completely acylated" we mean that the polyamine compound, after acylation, has no reactive primary or secondary amino groups remaining in the molecule (the NHCOR groups at either end of the molecule being, for all practical purposes, incapable of being acylated further), and preferably includes at least one COR group for each nitrogen atom present, where R is a hydrocarbon radical. The latter is not strictly required, inasmuch as some of the compounds may, during their synthesis, form cyclic compounds such as imidazolines in which one or more of the nitrogen atoms may be tertiary atoms and still have no amide group associated with it. Nevertheless, this type of compound still satisfies the requirement that there be no reactive primary or secondary amino groups present. While at least one of the amide radicals includes a radical having at least 7 carbon atoms, and preferably at least 11 carbon atoms, the other amide radicals in the compound may contain either high molecular weight or low molecular weight carboxylic acid residues.

Polyamides of high molecular weight carboxylic acids are oil soluble and water insoluble, making them particularly suitable for use in the treatment of sour crude oil wells having good oil yields, and where the fluid level in the annulus is relatively low during pumping of the well. Such oil soluble compounds include tetranaphthenoyl triethylenetetramine, tetralauroyl triethylenetetramine, tetraoleoyltriethylenetetramine, tristearoyl diethylene triamine, pentacapryloyl tetraethylenepentamine, tetrabietoyltriethylenetetramine, pentaundecanoyl tetraethylenepentamine.

For treating sour crude oil wells having a high fluid level in the annulus and a high brine content, it is preferable to use a polyamine acylated with a mixture including the high molecular weight carboxylic acid, and a molecular excess of low molecular weight carboxylic acid to produce a completely acylated polyamine in which one or two of the amide groups contain a long chain acid and the remaining amide groups, numbering two or more, contain the short chain acids. Typical compounds of this type include mono-oleoyltriacetamide of triethylenetetramine, monostearolyltriacetamide of triethylenetetramine, mono-abietoyl tetraformamide of tetraethylenepentamine, monolauroyltriacetamide of triethylenetetramine, monostearolylbutyroyldiacetamide of triethylenetetramine, nonoricinoleoyltetra-acetamide of tetraethylenepentamine, dilauroyl - diacetoyltriethylenetetramine, tristearoylacetoyltriethylenetetramine, oleoyltriacetoyl triethylene tetramine, and abietoyl tetra-acetoyl tetraethylene pentamine.

For the treatment of sweet crude oil wells, and in cases of high brine content, a mono long chain amide which has been further reacted with acetic acid compounds is particularly effective. These compounds are also effective in flood operation in secondary oil recovery since they are water soluble and dispersible as well as oil dispersible.

The following type compound is an effective corrosion inhibitor for sour and sweet crude oil wells:

Mononaphthenoyl diacetamide 3,3'-imino-bispropylamine

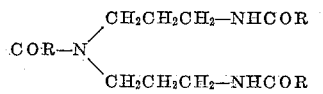

R=carboxylic acid residue with proviso that one R is high molecular weight hydrocarbon radical and the other R's may be CH$_3$.

Also, the ethanol derivatives of the aliphatic polyamines may be used for preparing the polyamides of this invention. Examples of such effective compounds comprise the following: Mononaphthenoyltriacetoyl triethylenetetramine-ethanol, mono-oleoyldiacetoyl diethylenetriamine-ethanol.

Other acylated aliphatic polyamines include the mono long chain amide polyhydroxyacetamide, e.g.:

Stearoyltrihydroxyacetoyl triethylene tetramine

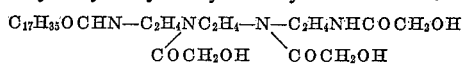

Naphthenoyl di(hydroxyacetoyl) dipropylenetriamine

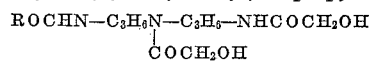

where C$_3$H$_6$ may be either the normal or the iso radical, R=naphthenyl radical.

N-oleyl, di(hydroxyacetoyl) propylenediamine

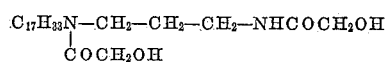

Oleoyltetra(hydroxyacetoyl)tetraethylenepentamine

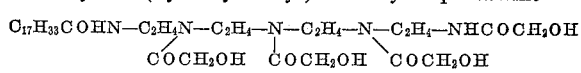

The above compounds have the additional desirable characteristic of being able to inhibit scale deposits both in oil well apparatus and in aqueous systems generally.

The mercapto acetamide derivatives also form a part of this invention:

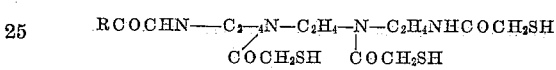

R=naphthenic acid residue.

Laurolytri(mercaptoacetoyl)tripropylenetetramine

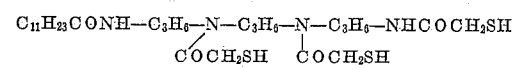

N-oleyldi(mercaptoacetoyl)propylenediamine

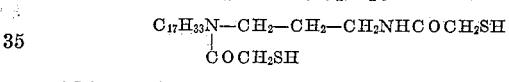

N-lauryldilauroylpropylenediamine

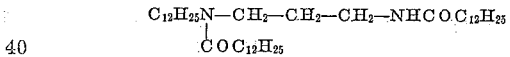

The various corrosion inhibitors were tested for usefulness in sour crude oil wells according to the "dynamic" method described by Greco and Spaulding (NACE, March 1953). In essence, this method provides for the determination of the weight loss of a steel coupon which is used to stir a mixture of oil and brine in a corrosive atmosphere. In conducting this test, steel coupons are inserted in chucks and rotated within a 50–50 mixture of brine and kerosene. The brine solution contains sodium chloride, sodium sulphate, magnesium chloride hexahydrate, and calcium chloride dihydrate.

The test coupons are first cleaned and sand blasted, and any surface scale is removed by treatment in acid. After neutralization of the acid and drying, the test coupons are weighed and then inserted into the chucks.

As the test coupons are being rotated within the corrosive brine-kerosene mixture, hydrogen sulphide and nitrogen gas are fed into the system at standarized flow rates. A typical atmosphere for the test is a mixture of about 0.25 atmosphere hydrogen sulphide, 0.75 atmosphere nitrogen, pH of about 5, a temperature of 100° F., and a test period extending for 23 hours.

After the test run has been completed, the coupons are removed from the chucks and immersed in benzene. The deposits of corrosion products are wiped off with a rag, and the coupons are cleaned in a 25% sodium hydroxide solution at 200° F. for two minutes. Then, they are removed and brushed under running water and dipped for one-half second in dilute hydrochloric acid. Finally, they are brushed with soap, rinsed, dried, and placed in a desiccator, and then weighed. In the standard sized sample, the coupon cleaning treatment results in an average loss of 0.7 milligram, which is deducted from the weight loss shown by the coupons to give the actual corrosion figures.

The results of this test are converted to penetration in mils per year using the equation:

$$C = \frac{11.4W}{t}$$

where $C$ = penetration in mils/year
$W$ = weight loss in milligrams
$t$ = time in hours In addition to the test procedure outlined above, some of the compounds were tested by a "static" test method as follows. A test coupon is suspended in a tall cylinder and covered with a layer of kerosene containing the inhibitor to be tested. Carbon dioxide is passed through the cylinder to displace the air, and a layer of brine is run in under the kerosene until it covers the coupon. The brine solution used in this test is similar to that described previously except that it contains 0.1% acetic acid, and the oxygen is removed by sweeping with carbon dioxide. The brine is handled in a closed system to prevent access by the air.

After the coupon has been covered with brine, the cylinder is closed and stored at 75° F. for one week. The coupon is then cleaned, dried, and weighed. The penetration in mils per year is then calculated. The result is compared with a control coupon corroded under the same conditions, except in the absence of the inhibitor, to determine the percent inhibition.

Specific examples of the preparation of various compounds is given below:

I. OLEOYLTRIACETOYLTRIETHYLENE-TETRAMINE (Two step reaction)

29.2 grams (0.2 mole) triethylenetetramine and 59 grams (0.2 mole) of oleic acid were heated to 180° C. for a total of six hours. The reaction product was then cooled to 100° C. after which 36 grams (0.6 mole) of glacial acetic acid were added and heated for about 5 hours or until a temperature of 200° C. was attained. The product was a dark brown solid. This corrosion inhibitor was tested in accordance with the sour crude test and showed 70.4% inhibition of corrosion. The test for corrosion inhibition properties under sweet crude conditions showed 93.7% inhibition.

II. NAPHTHENOYLTRIACETOYLTRIETHYLENE-TETRAMINE 14.8 grams triethylene tetramine was condensed with 28.2 grams of naphthenic acid in 250 cc. xylene until 2 cc. of water were removed. The reaction product was cooled and 18 cc. glacial acetic acid was added and the heating continued until 6.2 cc. of water was removed. (Theoretical 5.4 cc.). Xylene was then removed by vacuum distillation. The reaction product was a sticky, brown paste. Corrosion inhibition in sour crude showed 80.8% inhibition and in sweet crude 62.1% corrosion inhibition.

III. STEAROYL-TRI(HYDROXY ACETOYL)TRI-ETHYLENETETRAMINE

A mixture of 1 mole of stearic acid and 1 mole of triethylenetetramine was heated for two hours at 280° F. to 398° F. in a 500 ml. flask equipped with mechanical stirrer, thermometer and reflux condenser, attached to a Dean-Stark trap. The yield of the product was 284 grams with acid value of 2.5. A solution of 100 grams of the reaction product (stearoyltriethylene tetramine) in 270 ml. of xylene was heated to the reflux temperature in a 1000 ml. flask equipped with mechanical stirrer, reflux condenser attached to a Dean-Stark trap, and a dropping funnel. 70 grams of a 70% aqueous solution of hydroxy acetic acid were then added dropwise with stirring. When addition of the acid was complete, the solution was heated at 270°–290° F. for eight hours during which time 36.4 ml. of water distilled. After distilling the xylene at reduced pressure, the product weighed 119 grams. Corrosion test in sour crude showed 61.6% corrosion inhibition and in sweet crude 67.4% inhibition.

IV. DISTEAROYLTRIACETOYLTETRAETHYLENE-PENTAMINE (Two step reaction)

57 grams of stearic acid and 19 grams of tetraethylenepentamine were heated together at from 140° to 180° C. for eight hours, yielding a light brown, hard wax, soluble in water, neutral to phenolphthalein and characterized by a saponification number of 4.65. 64.7 grams of the resulting product were heated with 14 grams of acetic anhydride for five hours at from 143° to 170° C., yielding 76.6 grams of a hard wax which could be ground to a fine powder, having a chocolate color. This powder was found to be soluble in ethanol, acetone and toluene and could be recrystallized from petroleum ether and from acetic anhydride. 1 gram of the product could be dissolved in 10 cc. of water by warming to form a thick soapy solution which presented a silky colloidal appearance when diluted. The product showed good corrosion inhibition in sweet crude corrosion test.

V. NAPHTHENOYL-TRI(HYDROXY ACETOYL)-TRIETHYLENETETRAMINE (One step reaction)

29.2 grams of triethylenetetramine (0.2 mole) and 56.4 grams (0.2 mole) of naphthenic acid, and 65.1 grams (0.6 mole) of 70% hydroxy acetic acid were stirred and heated at 370°–420° F. for six hours in a 500 ml. flask equipped with thermometer, mechanical stirrer and reflux condenser attached to a Dean-Stark trap. The theoretical quantity of water was distilled in this time. The product weighed 99.4 grams. The sweet crude test for corrosion inhibition showed 51.7% efficiency.

VI. TETRANAPHTHENOYLTRIETHYLENETET-RAMINE

A mixture of 400 grams (4 moles) of naphthenic acid (Socony Vacuum 190) and 146 grams (1 mole) of triethylenetetramine were heated for six hours at 390° F. to 404° F. in a 500 ml. flask equipped with a mechanical stirrer, thermometer and reflux condenser attached to a Dean-Stark trap. The reaction product gave a sour crude test of 95.4% corrosion inhibition and the sweet crude test showed 30.5% corrosion inhibition. This product, therefore, is an excellent oil soluble corrosion inhibitor especially effective for sour crude.

The test results obtained in the inhibition tests for various compounds of the present invention are given in the following tables:

I. Polyalkylenepolyamides in sour crudes

STATIC TEST

| Treatment | Dosage, p.p.m. | Penetration (MPY) | Inhibition |
|---|---|---|---|
| Tetranaphthenoyl - triethylenetetramine | 60 | 1.7 | 85.8 |
| Oleoyltriacetoyl-triethylenetetramine | 60 | 1.6 | 90.7 |
| Oleoyltriacetoyl-triethylenetetramine | 60 | 0.22 | 98.2 |
| Oleyl N-distearoyl n-propylenediamine | 60 | 0.3 | 97.5 |

DYNAMIC TEST

| Treatment | Dosage, p.p.m. | Penetration (MPY) | Inhibition |
|---|---|---|---|
| Stearoyltriacetoyl-triethylenetetramine (2 step) | 60 | 2.9 | 83.1 |
| Oleoyltriacetoyl - triethylenetetramine (2 step) | 60 | 5.1 | 70.4 |
| Oleoyltriacetoyl - triethylenetetramine (1 step) | 60 | 2.0 | 88.4 |
| Naphthenoyltriacetoyl - triethylenetetramine (2 step) | 60 | 3.3 | 80.8 |
| Tetranaphthenoyltriethylene - tetramine | 60 | 0.8 | 95.4 |

II. Polyalkylenepolyamides in sweet crudes

STATIC TEST

| Treatment | Dosage, p.p.m. | Penetration (MPY) | Percent Inhibition |
|---|---|---|---|
| Stearoyltri(hydroxyacetoyl) - triethylenetetramine | 60 | 1.6 | 67.4 |
| Oleoyltriacetoyl - triethylenetetramine, 1 step reaction | 60 | 0.49 | 87.1 |
|  | 60 | 0.25 | 93.7 |
| Oleoyltriacetoyl - triethylenetetramine, 2 step reaction | 60 | 0.82 | 67.2 |
| Naphthenoyltriacetoyl - triethylenetetramine, 2 step reaction | 60 | 1.1 | 62.1 |
|  | 60 | 1.5 | 46.5 |
| Naphthenoyltri(hydroxyacetyl) - triethylenetetramine | 60 | 1.4 | 51.7 |
| Tetranaphthenoyl - triethylenetetramine | 60 | 5.3 | 30.5 |
| Stearoyltriacetoyl - triethylenetetramine, 2 step reaction | 60 | 0.38 | 90.5 |
| Lauroyltriacetoyl - triethylenetetramine | 60 | 0.45 | 92.4 |

It is interesting to observe from the above table that the oleoyltriacetoyl triethylenetetramine produced by the one step reaction provided a more effective corrosion inhibitor than the two step reaction. Apparently, in the two step reaction, the oleoyl group or groups attach themselves to the primary amino groups, whereas in the one step reaction, the oleoyl groups are more likely to be distributed at random among the primary and secondary amino groups.

In compounding the corrosion inhibiting compositions of the present invention it is desirable to include vehicles which can withstand very low temperatures that might be encountered in the oil fields. Consequently, we prefer to employ an aqueous mixture of one of the lower alcohols such as ethanol, or iso-propyl alcohol, or any alcohol containing one to five carbon atoms. A typical formula for the composition is the following:

| | Percent |
|---|---|
| Mono-oleoyltriacetoyl triethylenetetramine | 50 |
| Iso-propyl alcohol | 25 |
| Tap water | 25 |

The foregoing composition is completely water dispersible and oil insoluble, thereby permitting the inhibitor solution to pass through the surface oil layer quickly and proceed downwardly into the brine under the oil. On mixing with the brine, the composition eventually reaches the bottom of the well where the inhibitor mixes with the production fluid passing up through the tubing, thereby giving protection against corrosion to the well casing, the tubing, and the sucker rods as well as to the distribution lines at the surface. The foregoing treatment is specifically designed for use in sour or sweet crudes and is effective in wells where large amounts of water are produced. The inhibitor formula mentioned previously has a flash point of 75° F., a pour point of minus 30° F., and a density of 7.96 pounds per gallon.

For sour crude wells where hydrogen sulphide is the principal corroding agent, a particularly effective composition may consist of the following:

| | Percent |
|---|---|
| Tetranaphthenoyl triethylenetetramine | 50 |
| Kerosene | 25 |
| High flash point aromatic hydrocarbon solvent | 25 |

The inhibitor compositions may be introduced into the wells by any convenient means, including intermittent or continuous pumping, or by batch application. The method most commonly used involves the introduction of the composition into the well by flushing for several minutes with recirculating production fluids. Water or brine may be used for the flushing if the well head construction is not equipped for production fluid recirculation.

For continuous application of the inhibitor composition, a proportioning pump may be used or, if intermittent feeding is desired, a timer operated pump may be used.

The dosage requirements will, of course, vary with a particular well being treated. However, as a general rule, for flowing or pumping oil wells with an open annulus, about five gallons of the formula are introduced and recirculated through the well annulus for one or two hours. Subsequently, about one gallon per day for the next five days is added, and recirculated for several minutes. Subsequent dosages should be based upon the application of about 10 to 200 parts per million calculated on the prior production of fluid (oil and water), with 60 parts per million being a good starting average. 60 parts per million are equivalent to one quart of treatment per 100 barrels of produced fluid.

The effectiveness of the corrosion inhibitor can be determined from day to day operation of the well in any of a variety of manners. The first of these is the determination of the iron content of the produced fluid before and after using the corrosion inhibiting treatment. This method is applicable where it is convenient to make such iron determinations, and where the iron content of the produced fluid is more or less uniform.

Another method for evaluating the results consists in introducing the test coupons into the T fitting at the well head, and after a period of 30 or 60 days, removing the coupons to check them for weight loss. After the corrosion rate has been established by this method, the use of test coupons is continued after the start of treatment in order to obtain comparable figures. After the period of exposure, the test coupons should be carefully removed, washed in Stoddard solvent to remove the oil, and wiped dry before returning to the laboratory for cleaning and weighing.

The most dependable method of determining the effectiveness of the corrosion inhibitor is based upon the frequency of "pulling" the well for the purpose of replacing tubing and rods. Thus, the extension of tubing and rod life and reduction of maintenance requirements and costs are the final evaluation factors.

From the foregoing, it will be appreciated that the compositions and methods of the present invention provide substantial improvements in inhibiting corrosion by fluids, particularly those corrosive fluids which occur in oil well installations.

It will be evident that various modifications can be made to the described embodiments without departing from the scope of the present invention.

We claim as our invention:

1. The method of inhibiting the corrosion of metallic surfaces by a corrosive aqueous liquid which comprises dispersing into said liquid a completely acylated aliphatic polyamine selected from the group consisting of those completely acylated with naphthenic acids alone and those completely acylated with acetic acid and an acid selected from the group consisting of aliphatic and cycloaliphatic acids having at least eight carbon atoms in their molecules; said acylated polyamine acylated with acetic acid containing a number of acetoyl radicals which is at least equal to the number of acid radicals having at least eight carbon atoms, and flowing said liquid past said surfaces.

2. The method of inhibiting the corrosion of metallic surfaces by corrosive aqueous liquids which comprises dispersing into said liquid, in an amount sufficient to become deposited on said surfaces, the tetranaphthenoyl amide of triethylenetetramine, and flowing said liquid along said surfaces to deposit said amide on said surfaces.

3. The method of inhibiting the corrosion of metallic surfaces by corrosive aqueous liquids which comprises dispersing into said liquid, in an amount sufficient to become deposited on said surfaces, the compound oleoyltriacetoyl-triethylenetetramine, and flowing said liquid along said surfaces to deposit said compound on said surfaces.

4. The method of inhibiting the corrosion of metallic surfaces by corrosive aqueous liquids which comprises dispersing into said liquid, in an amount sufficient to become deposited on said surfaces, the compound stearoyl-trihydroxyacetoyl triethylenetetramine, and flowing said liquid along said surfaces to deposit said compound on said surfaces.

5. A composition for treating metallic surfaces to prevent corrosion by corrosive aqueous fluids, said composition consisting essentially of a completely acylated polyamine selected from the group consisting of those completely acylated with naphthenic acids alone and those completely acylated with acetic acid and an acid selected from the group consisting of aliphatic and cycloaliphatic acids having at least eight carbon atoms in their molecules, the acylated polyamines which are acylated with acetic acid having a number of acetoyl radicals at least equal to the number of acid radicals having at least eight carbon atoms, in combination with a lower alkyl alcohol containing one to five carbon atoms, and water, the amount of alcohol and water present being sufficient to dissolve said completely acylated polyamine.

References Cited in the file of this patent

UNITED STATES PATENTS

| | | |
|---|---|---|
| 2,466,517 | Blair et al. | Apr. 5, 1949 |
| 2,468,163 | Blair et al. | Apr. 26, 1949 |
| 2,598,213 | Blair | May 27, 1952 |
| 2,605,223 | Case | July 29, 1952 |
| 2,643,227 | Hughes et al. | June 23, 1953 |
| 2,693,468 | Blair | Nov. 2, 1954 |
| 2,736,658 | Pfohl et al. | Feb. 28, 1956 |
| 2,805,135 | Bell et al. | Sept. 3, 1957 |